US011828121B2

(12) United States Patent
Park et al.

(10) Patent No.: US 11,828,121 B2
(45) Date of Patent: Nov. 28, 2023

(54) DOWNHOLE FIBER INSTALLATION EQUIPMENT AND METHOD

(71) Applicant: Halliburton Energy Services, Inc., Houston, TX (US)

(72) Inventors: Brian Vandellyn Park, Spring, TX (US); Mikko Jaaskelainen, Katy, TX (US); Seldon David Benjamin, Spring, TX (US); Jason Edward Therrien, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/936,627

(22) Filed: Sep. 29, 2022

(65) Prior Publication Data

US 2023/0026207 A1 Jan. 26, 2023

Related U.S. Application Data

(62) Division of application No. 16/325,996, filed as application No. PCT/US2016/056252 on Oct. 10, 2016, now Pat. No. 11,486,215.

(51) Int. Cl.
*E21B 23/14* (2006.01)
*E21B 23/01* (2006.01)
*E21B 47/135* (2012.01)
*E21B 17/20* (2006.01)
*G02B 6/50* (2006.01)
*E21B 47/12* (2012.01)

(52) U.S. Cl.
CPC ............ *E21B 23/14* (2013.01); *E21B 17/206* (2013.01); *E21B 23/01* (2013.01); *E21B 47/12* (2013.01); *E21B 47/135* (2020.05); *G02B 6/502* (2013.01)

(58) Field of Classification Search
CPC .................................. E21B 23/14; E21B 23/01
See application file for complete search history.

(56) References Cited

U.S. PATENT DOCUMENTS

| 2011/0234421 A1* | 9/2011 | Smith | H01B 3/004 340/854.3 |
| 2011/0274398 A1* | 11/2011 | Fini | G02B 6/0365 385/124 |
| 2013/0336612 A1* | 12/2013 | Pearce | E21B 47/113 385/12 |
| 2015/0167416 A1* | 6/2015 | Ludwig | E21B 4/006 166/385 |
| 2016/0215578 A1* | 7/2016 | Adnan | E21B 23/01 |

* cited by examiner

Primary Examiner — Giovanna Wright
(74) Attorney, Agent, or Firm — K&L Gates LLP

(57) ABSTRACT

Various embodiments include methods and apparatus structured to install an optical fiber cable into a well at a well site. In a from-bottom-to-top embodiment, an anchor deployed at a selected location in a hole of the well can be used and the optical fiber cable can be pulled up to a surface of the well from the selected location. In a from-top-to-bottom embodiment, an optical fiber cable can be moved down from the surface until an end of the optical fiber cable is locked at a selected location by a catcher disposed at the selected location. With the optical fiber cable in the well, a portion of the optical fiber cable can be coupled to surface instrumentation. Additional apparatus, systems, and methods can be implemented in a variety of applications.

17 Claims, 6 Drawing Sheets

DOWNHOLE FIBER INSTALLATION EQUIPMENT AND METHOD

TECHNICAL FIELD

The present invention relates generally to apparatus and methods related to drilling for oil and gas exploration.

BACKGROUND

In the oil and gas industry, the generation and management of wells includes measuring the properties and events associated with the wells and the formations in which the wells are located. A number of techniques can be used to monitor and measure the properties and events associated with the wells. The techniques include the use of distributed temperature sensing (DTS) and distributed acoustic sensing (DAS) systems using an optical fiber. DTS and DAS systems are commonly used to identify fluid placement real time, fluid placement by measuring formation temperature warm back, leak detection, cross flow, sand and proppant movement and placement, sand-out, seismic events, and microseismic events etc.

The established method for installing optical fiber in oil wells for telemetry and sensing purposes consists of clamping fiber encased in metal tubing to the outside of casing or pipe using clamp protectors at every pipe joint, or using blast protectors in zones that will be perforated for fracking or other applications. This installation is typically performed on the rig floor as the piping is lowered into the wellbore. While the fiber is protected by the tubing and clamps, it is still subject to damage from the formation as it is run in hole, particularly in horizontal sections, and it can also be damaged during perforations if the blast protectors are not located properly or the explosive charges are not aimed away from the fiber. In addition, the cost of a fiber installation is significant, and can take up days of rig time.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, electrical, and mechanical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, techniques can be implemented that allow an optical fiber to be automatically and reliably installed inside a pipe after the pipe has been installed in a wellbore, after the well has been perforated, or after the well has been fracked, without the need for protective tubing, clamps, or blast protectors. Such techniques can significantly reduce risk of damage, reduce the cost and time of installation, and provide better contact with the production fluids being measured by the optical fiber for better signal quality.

Figure 1:
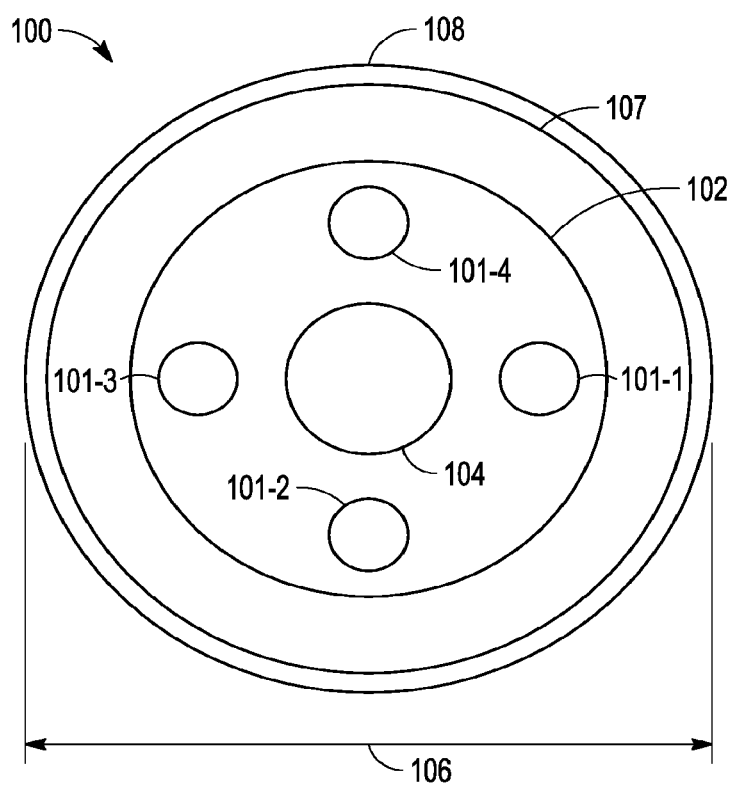
FIG. 1 is a schematic representation of a cross section of an example optical fiber cable, in accordance with various embodiments.

FIG. 1 is a schematic representation of a cross section of an embodiment of an example optical fiber cable 100. The optical fiber cable 1000 may include an optical fiber 102 that is a large diameter optical fiber. A large diameter optical fiber can include an optical fiber at least 200 µm in diameter over larger. A larger diameter optical fiber may be realized by an optical fiber of around 250 µm in diameter. Some applications can use optical fibers as large as 500 µm in diameter. The optical fiber 102 can be realized with other diameter sizes. The optical fiber 102 can be a glass fiber. The optical fiber 102 can have a glass diameter greater than 125 µm. For example, the optical fiber 102 can have a glass diameter of 200 µm or greater.

The optical fiber 102 can include a number of cores. For example, the optical fiber 102 may include a multi-mode core 104 and a set of single mode cores 101-1, 101-2, 101-3, and 101-4. Though the optical fiber 102 is shown as a large diameter optical fiber with four single mode cores, the number of single mode cores in the set can be more or less than four.

A neutral buoyancy layer 107 can be used surrounding the optical fiber 102. By making the optical fiber 102 neutrally buoyant, it will neither rise or fall inside a tubing it is installed inside, and has effectively zero weight. This prevents slumping of the coil spiral of the deployed optical fiber 102 due to gravity. The optical fiber 102 can be made neutrally buoyant by surrounding the multi-mode core 104 and the single mode cores 101-1, 101-2, 101-3, and 101-4 with low density material such as foam or plastic.

The optical fiber 102 can include a jacket 108 disposed around the neutral buoyancy layer 107, as a protective outer jacket. The jacket 108 can be an outer sheath of Kevlar or similar material protects the optical fiber 102. The optical fiber cable 100 may have an overall diameter 106 that is around 1 mm (1000 microns). However, the optical fiber cable 100 can have an overall diameter 106 that is more or less than 1000 microns. The optical fiber cable 100 having an overall diameter 106 that is around 1 mm is much smaller than current downhole fiber cables, which typically have a ¼" diameter steel tubing. In addition, the optical fiber cable 100 or a similar optical fiber cable can have lengths of 20,000 feet or more that can be wound on a spool, which can be sent downhole. The cost per meter is significantly cheaper than optical fiber encased in steel tubing. An optical fiber cable can include one or more optical fibers, each with associated protective structure around the optical fibers.

The large diameter to an optical cable, relative to optical fibers with small diameters, increases the stiffness of the optical fiber and reduces the occurrence of microbending optical loss. Microbending loss is caused by side loads on the optical fiber that may be applied in a periodic manner causing small deflections or bends in the fiber, roughly periodic along the length of the fiber, that cause guided modes to couple to lossy cladding modes. These deflection or small bends can cause high loss for standard optical fibers.

Figure 2:
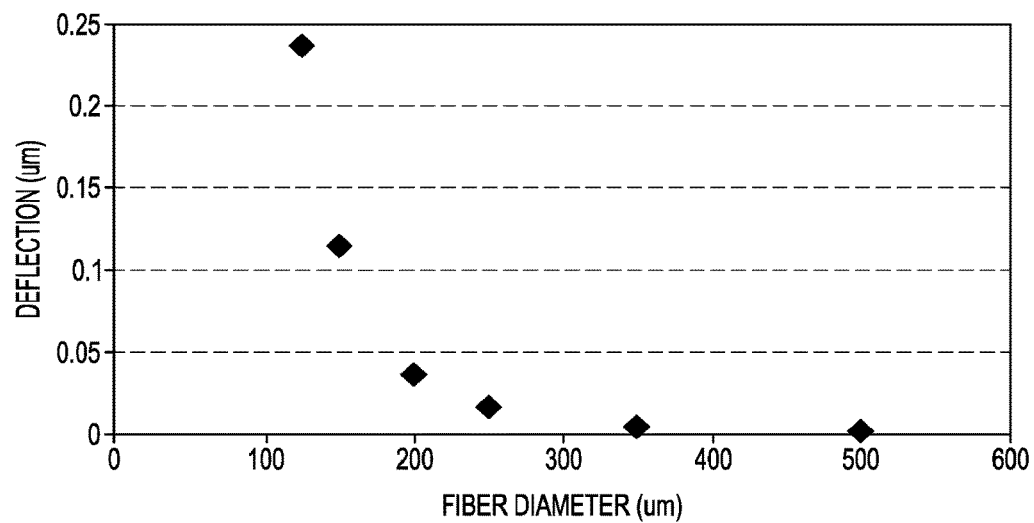
FIG. 2 is a plot of deflection versus fiber diameter, in accordance with various embodiments.

FIG. 2 is a plot of deflection vs fiber diameter. In this example, the deflection from a small point load applied in the middle of a 1.0 mm long fiber is shown for increasing optical fiber diameter. The deflection and, thus, microbend loss drop steeply with fiber diameter.

Figure 3:
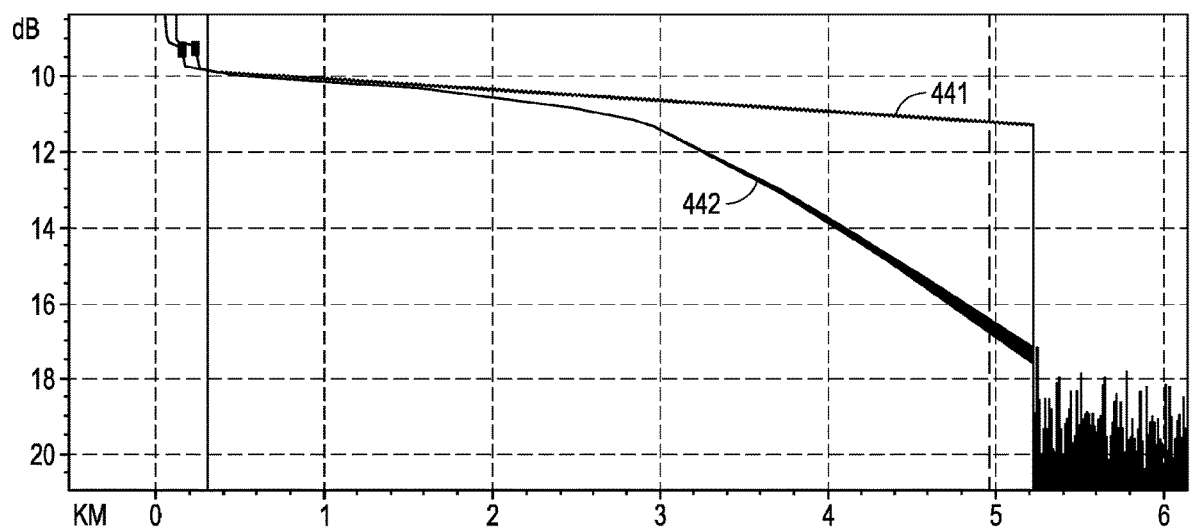
FIG. 3 is a plot of signal versus distance, providing an example of pressure induced microbending, in accordance with various embodiments.

Optical fibers of 125 um diameter glass in typical polymer coatings and jackets experience severe microbending loss when exposed to downhole pressures. The inventors have observed this issue associated with downhole pressures. FIG. 3 is a plot of signal versus distance, providing an example of pressure induced microbending. The curve 442 is for a 50 μm multi-mode optical fiber. The curve 441 is for a single mode optical fiber in the same cable. A temperature induced pressure in the cable caused high loss in the multimode fiber in the range of 2 km to approximately 5 km. The multi-mode optical fiber has a large induced attenuation due to microbending (over 2 dB/Km), while the single mode optical fiber is much more resistant to microbending. Conventional diameter optical fibers, exposed to downhole pressures, would have higher losses than this example.

Large diameter optical fibers can have either one or many cores internally. In an example, these cores may be single mode having a 9 μm diameter or multimode having a 50 μm diameter or a mixture of both. Other diameter cores can be implemented. A single mode core may be used for DAS and a multimode core may be used for DTS or other sensing applications. Single mode cores can be used for strain sensing (DSS) and off-axis single mode cores can be used for shape sensing. DTS temperature traces can be used to calibrate Brillion strain measurements. In the case of a single, single mode core, various interrogation techniques can be combined using wavelength division multiplexing or time division multiplexing to share the core.

The strength of glass in the optical fiber is much stronger than steel of equivalent diameter, and much more resilient to breaking during deployment. The glass optical fiber can have a hermetic coating to protect it from fluid and hydrogen exposure. Carbon based hermetic coatings also improve long term fatigue characteristics of the optical fiber.

Figure 4:
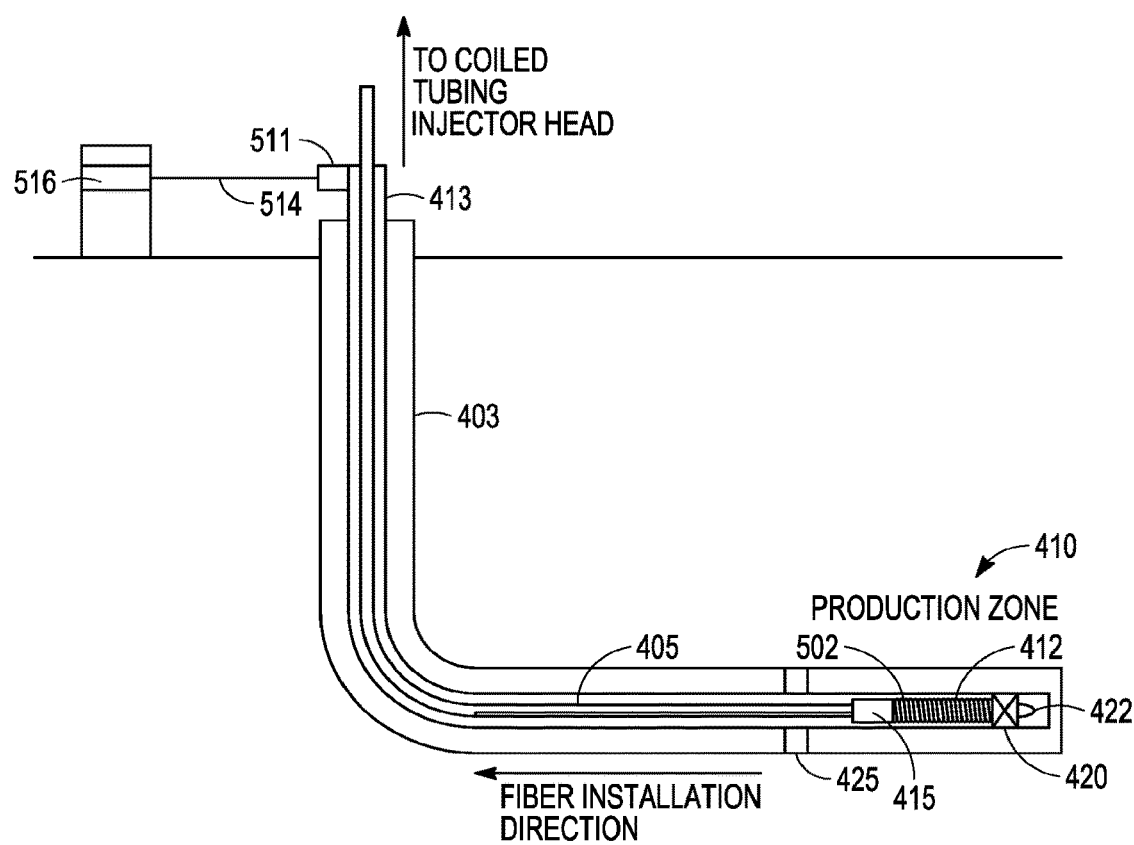
FIG. 4 is a schematic representation of an example of coiled tubing spooler insertion, in accordance with various embodiments.

FIG. 4 is a schematic representation of an embodiment of an example of coiled tubing spooler insertion, where coiled tubing injector head and associated pressure control equipment are not shown. This insertion procedure provides for installation of an optical fiber 502 in a well 403 using coiled tubing in a from-bottom-to-top installation process. The well 403 may be a cased hole. A fiber spooler 410 can be mounted to the end of a coiled tubing 405. The fiber spooler 410 can be fed to the end of the well 403 by the coiled tubing 405 in a production string 413 from a coiled tubing injector head. The end of the well 403 can be located in a production zone of a formation. The fiber spooler 410 can include a deployable anchor 420 to which one end of the optical fiber 502 to be laid is attached, a fiber spool 412 containing the optical fiber 502 to be laid, and a mud motor 415, which drives the fiber spooler 410 from fluid being pumped into the coiled tubing 405. A mud motor, as used herein, is a positive displacement motor to drive an object using hydraulic power of a fluid. Typically in drilling operations, mud motors are used to drive a drill bit using drilling fluid and in directional drilling operations.

Once the bottom of the well 403 has been reached, the deployable anchor 420 can be deployed, which grips the inside of the piping of the production string 413 and holds the end of the optical fiber 502 at the end of the hole of the well 403. A packer 425 can be deployed above the fiber spooler 410. The anchor deployment can be performed in a number of ways. A relatively simple method includes use a burst disk, which lets in downhole pressure to a piston that drives open levers, which grip the piping.

Figure 10:
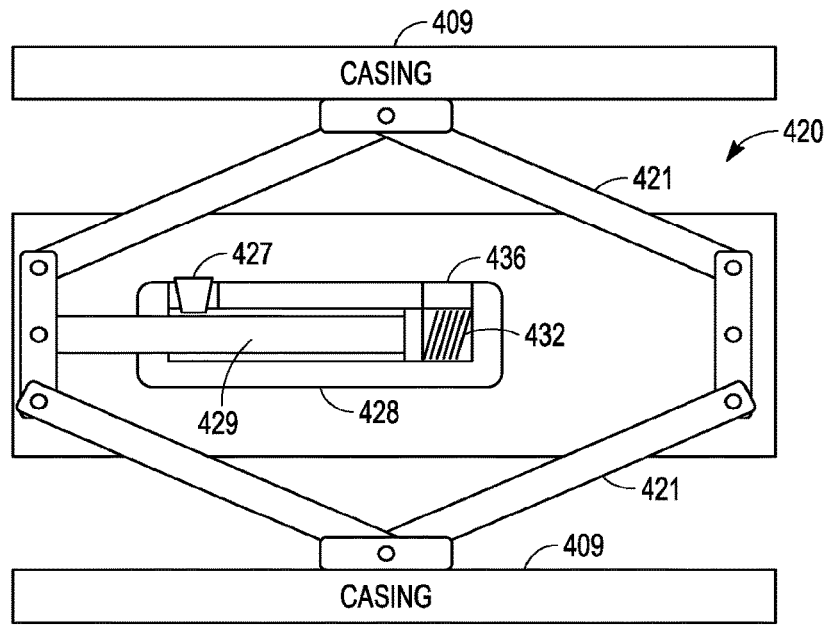
FIG. 10 is a schematic representation of an example deployable anchor that may be used to hold the end of an optical fiber at the end of a well, in accordance with various embodiments.

FIG. 10 is a schematic representation of features of an example of deployable anchor 420 that can that may be used to hold the end of an optical fiber at the end of a well. The deployable anchor 420 can include pressure activated locking arms 621 for gripping a casing wall 409. The deployable anchor 420 can be activated by rupturing a low pressure burst disk 427 using pressure (shown as ruptured in FIG. 10). This allows pressure into a cylinder 428, which causes a piston 429 to move and expand the gripper arms 421 against the inner diameter of the casing wall 409, which may be a collar. A return spring 432 is compressed by the pressure force on the piston 629.

The deployable anchor 420 can be retrieved together by rupturing a high pressure rupture disk 436. The high pressure rupture disk 436 is high pressure in that it is ruptured at a pressure higher than the pressure that the pressure burst disk 427 is ruptured. This equalizes the pressure on both sides of the piston 429 and the spring 432 expands, causing the locking arms 421 to retract, freeing the assembly for retrieval. For additional information regarding actuator mechanisms in downhole applications, see for example international patent publications such as WO2016137468A1, WO2016137465A1, and/or WO2016137462A1.

As shown in FIG. 4, the deployable anchor 420 may also contain a fiber optic pressure gauge 422, which can provide pressure readings at the toe of the well 403. The core of the optical fiber 502 or one of the cores of the optical fiber 502, if the optical fiber is a multi-core optical fiber, can be used to communicate information to the surface with respect to the pressure readings generated by the fiber optic pressure gauge 422. The optical fiber 502 may be realized by the optical fiber cable 100 of FIG. 1, or other optical fiber structure.

Then with the deployable anchored fixed in place, the coiled tubing 405 can be pulled out of the hole of the well 403 at a steady velocity, while, at the same time, fluid is pumped down the coiled tubing 405, which causes the mud motor 415 to rotate the fiber spool 412. The resultant combination of linear and rotational motion causes the optical fiber 502 to unspool in a spiral fashion firmly against the interior wall of the piping of the production string 413. The spiral pitch can be adjusted by varying the speed of revolution of the spool and/or adjusting the linear speed of the coiled tubing. It may also be possible to deploy the optical fiber 502 with minimum rotation so that the optical fiber length deployed in the well is equal to or near equal to the well depth.

For areas of interest, a high pitch can be used to increase the data from that region, and low pitch can be used to get the optical fiber to the surface. The continual rotary motion also prevents the optical fiber 502 from spontaneous reversing the direction of the helix which would create bend loss. The spiral contact with the wall of the pipe provides better thermal and acoustic coupling for improved signal quality, compared to optical fiber in metal tubing (FIMT) outside of the pipe. The spiral also ensures that the optical fiber 502 is out of the way of fluid flowing in the pipe.

The unspooling continues until the fiber spooler 412 reaches the surface. An end of the optical fiber 502 is removed from the fiber spool 412, fed through a well head exit 511, and spliced or coupled to a surface optical cable 514 connected to surface instrumentation 516. Horizontal or vertical fiber optic connectors or penetrations may be used depending on the well head exit 511 and/or fiber spooler 412 design. The fiber spooler 412 may, for example, have a removable portion with a fiber optic connector where the optical fibers are spliced to the fiber optic connector, and the removable section can be left in the well head, and can be connected to using horizontal or vertical tree connectors. This will make it easy to prepare connections to the optical sensing fibers, while providing a pressure seal using industry best practices for horizontal and vertical tubing hanger and tree connections. An example of a horizontal tree connector and a vertical tree connector is a commercial tubing hanger optical feedthrough system wet and dry mateable connector available from Deutsch Offshore.

Figure 5:
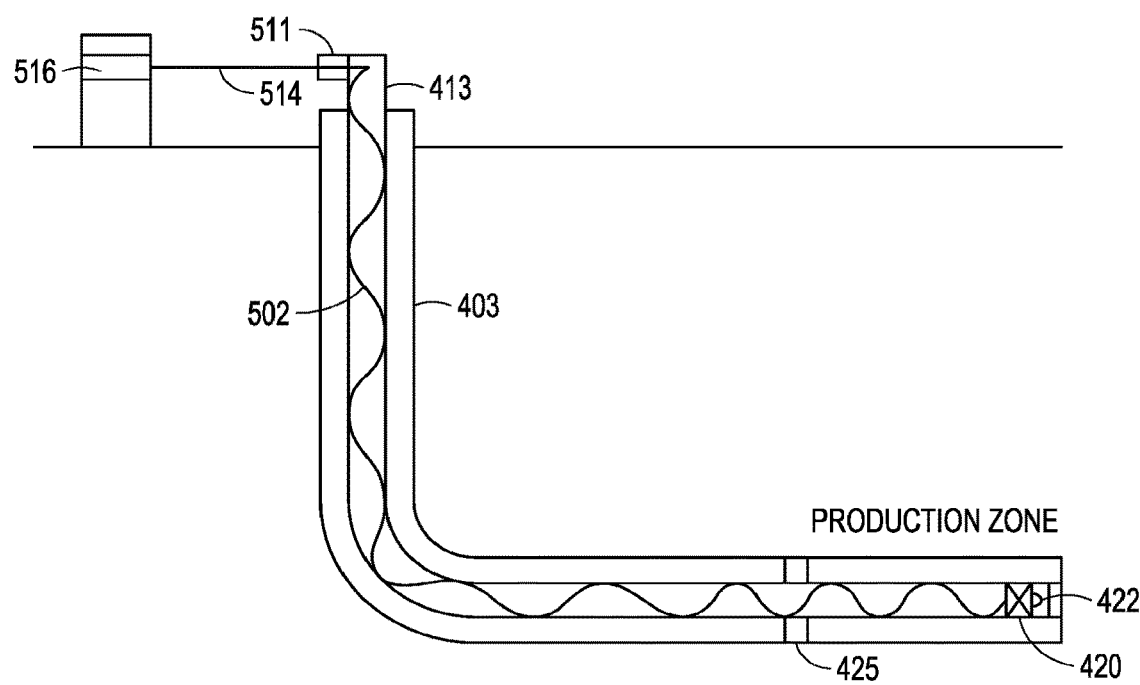
FIG. 5 is a schematic representation of the optical fiber deployed by coiled tubing of FIG. 4, in accordance with various embodiments.

FIG. 5 is a schematic representation of the optical fiber 502 deployed by coiled tubing in the bottom-to-top insertion procedure of FIG. 4. The optical fiber 502 is coupled to the fixed deployable anchor 420 and runs in a spiral to the well head exit 511 at the surface. The optical fiber 502 may have a tighter spiral in an area of interest, for example, near the fixed deployable anchor 420 in the region from the deployed packer 425 to the fixed deployable anchor 420. The surface optical cable 514 couples the optical fiber 502 from the well head exit 511 to surface instrumentation 516 that may include an interrogator. The interrogator can include an optical source that generates an optical signal in the optical fiber 502 to the end of the optical fiber 502 at the fixed deployable anchor 420, a receiver to receive a response optical signal or signals in response to the interrogation signal from the optical source, and processing equipment to process the received response optical signal(s). The received response optical signal(s) can include data from the pressure gauge 422 and/or data from the optical fiber itself being an optical fiber sensor and/or optical sensors deployed with respect to the optical fiber 502. The processing equipment of the interrogator of the surface instrumentation 516 can include one or more interferometric systems. The processing can be performed using one or more techniques as previously discussed or using other techniques of processing data from sensors associated with one or more optical fibers.

Figure 6:
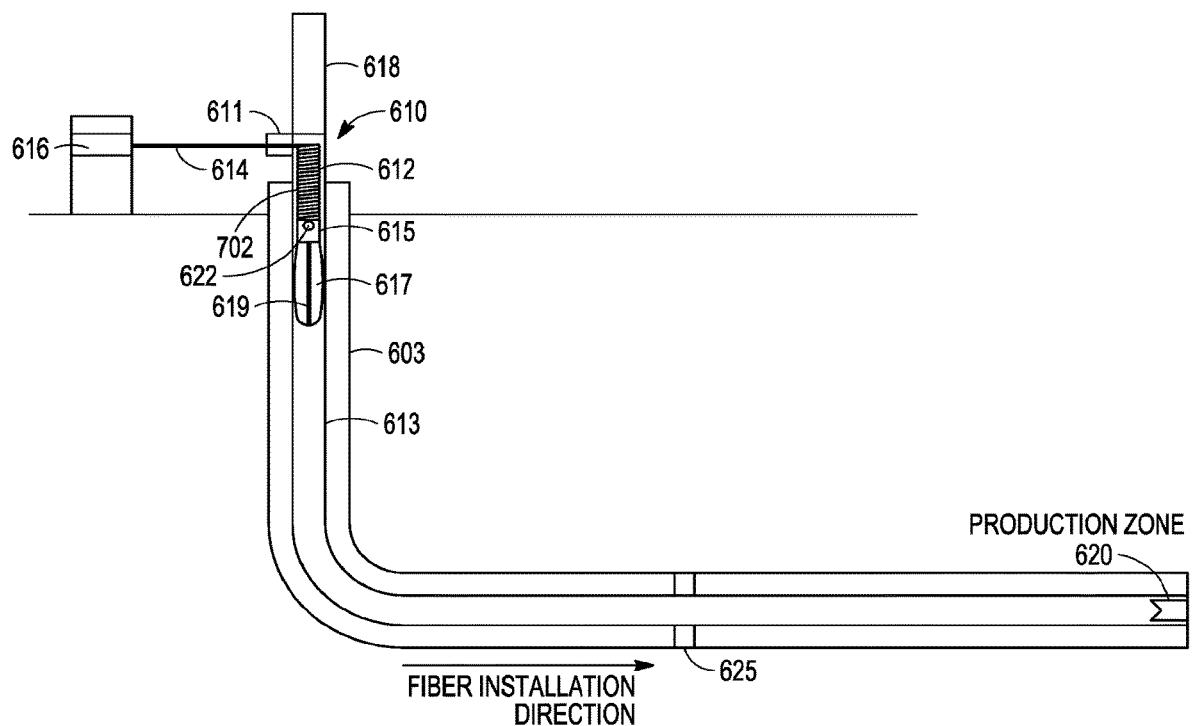
FIG. 6 is a schematic representation of an example of pump down spooler insertion, in accordance with various embodiments.

FIG. 6 is a schematic representation of an embodiment of an example of pump down spooler insertion. An optical fiber 702 can be installed in a well 603 using pump down installation in a from-top-to-bottom installation process in a production string 613. The well 603 may be a cased hole. Such a method can be employed without the use of coiled tubing equipment for deployment. In various embodiments, a fiber spooler mechanism 610, similar to that as described with respect to coiled tubing spooler insertion of FIG. 4, can be used except that a fiber spooler 610 in pump down insertion is designed to be pumped down from the surface and to lay the optical fiber 702 as it goes, from top to bottom, instead of from the bottom up to the earth surface.

The fiber spooler 610 can include a mud motor 615, a fiber spool 612 containing the optical fiber 702 to be laid, and a neutral buoyancy float 617. The neutral buoyancy float 617 can be made of syntactic foam with a density calculated to provide neutral buoyancy of the entire fiber spooler mechanism 610. Thus, it should neither float nor sink in pumping fluid used to pump the fiber spooler 610 towards the end of the well. When the pump down fluid is stationary, so too is the fiber spooler mechanism 610. This ensures that no additional strain is applied by gravity to the optical fiber 702 as it is unspooled. The mud motor 615 can be powered by the pumping fluid. To enable the fluid to pass through the mud motor 615, a conduit through the fiber spool 612 and the neutral buoyancy float 617 allows some of the fluid to exit to the fluid volume below the spooler mechanism 610. For example, 10% to 50% of the fluid flow may pass through the mud motor 615, while the rest of the flow moves the mechanism downhole. Other fluid ratios may be used.

The fiber spooler mechanism 610 can be first mounted in a spooler launcher 618. Fluid connections, valves and pressure control equipment are not shown on pool launcher 618. The spooler launcher 618 can be used to insert the fiber spooler 610 in the production string 613. The optical fiber 702 can be anchored at the surface by mounting an end of the optical fiber 702 to a well head exit 611. When pumping begins, the fiber spooler 610 starts to move downhole while at the same time the mud motor 615 rotates the fiber spool 615. This action causes the optical fiber 702 to be unwound in a spiral fashion against the inner wall of the pipe of the production string 613. See FIG. 7. With this fiber spooler mechanism 610, the relationship between rotational velocity and linear deployment velocity can be fixed by amount of flow through the mud motor 615, which is fixed in relationship to the total flow so that only a uniform spiral can be created. It cannot create variable pitch of the spiral, for example, a more concentrated pitch through areas of interest. It may also be possible to deploy the optical fiber 702 with minimum rotation and/or without the mud motor so that the optical fiber length deployed in the well is equal to or near equal to the well depth.

The fiber spooler 610 continues to unwind the optical fiber 702 until it reaches the bottom of the hole, where a catcher 620 locks on to the end of the fiber spooler 610 to prevent further movement, and locks the mud motor 615 to prevent further rotation. It is noted that once pumping commences, this process technique can be completely automatic. After the optical fiber 702 is laid with the arrival of the fiber spooler 610 at the end of the well 603, the fiber spooler 610 may not be retrieved. The fiber spooler 610 may also contain a fiber optic pressure transducer 611, which measures pressure at the toe of the well 603. The core of the optical fiber 702 or one of the cores of the optical fiber 702, if the optical fiber 702 is a multi-core optical fiber, can be used to communicate information to the surface with respect to the pressure readings generated by the fiber optic pressure gauge 622. The optical fiber 702 may be realized by the optical fiber cable 100 of FIG. 1, or other optical fiber structure.

Figure 7:
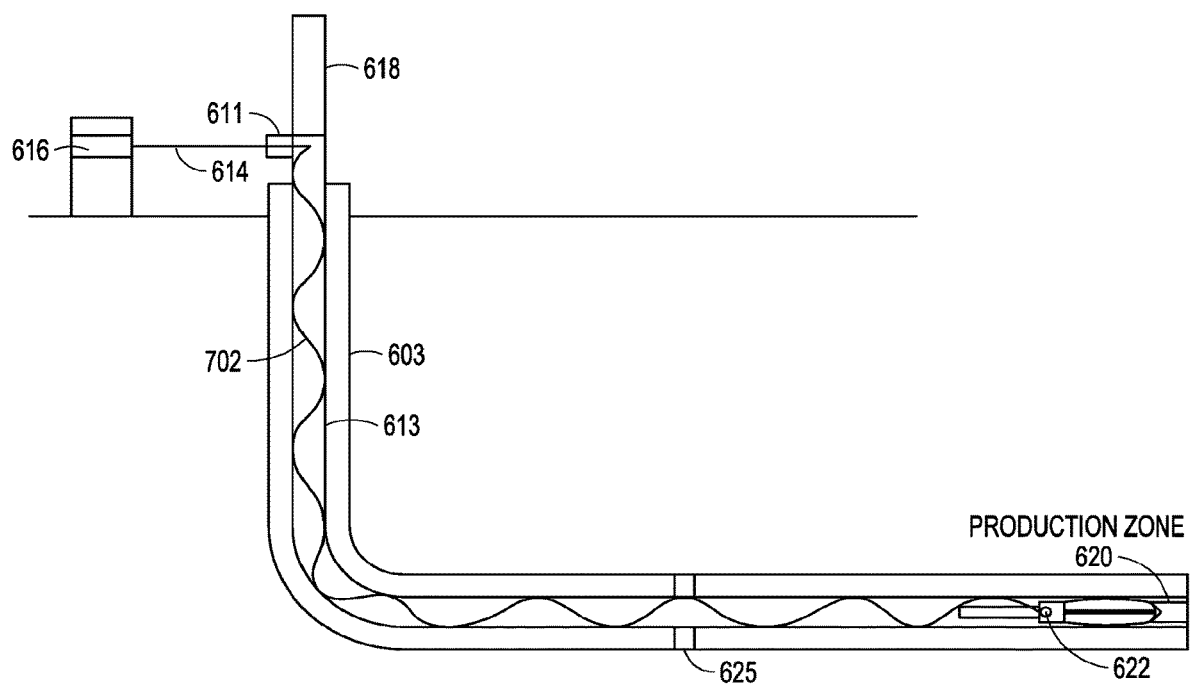
FIG. 7 is a schematic representation of the optical fiber deployed by the pump down spooler fiber deployment of FIG. 6, in accordance with various embodiments.
Figure 11:
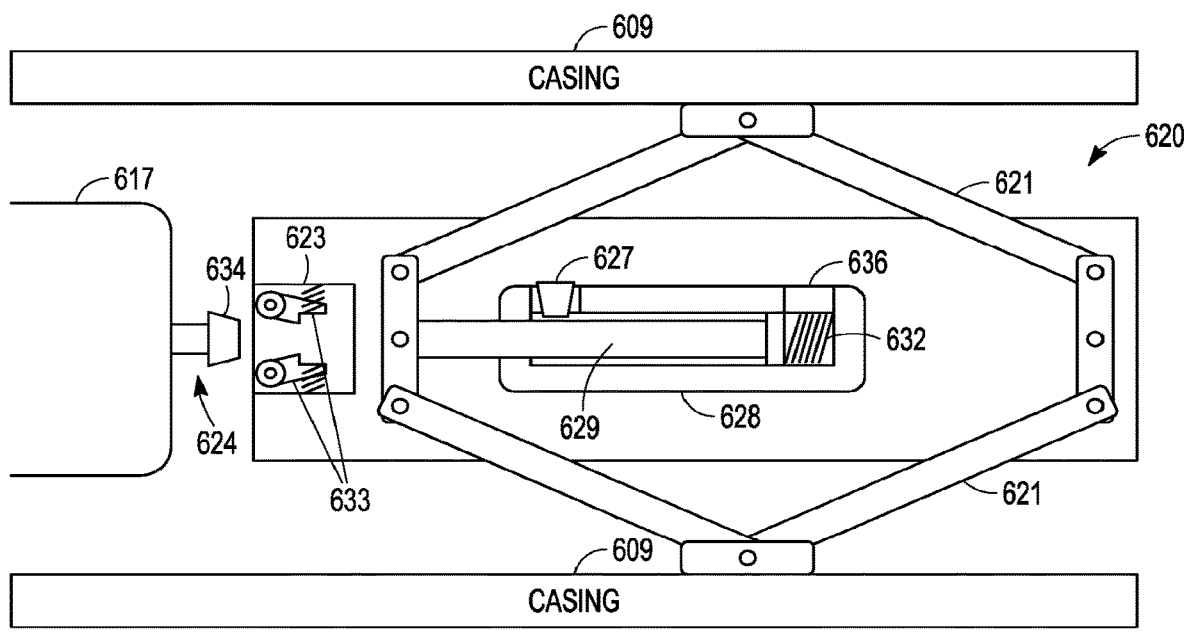
FIG. 11 is a schematic representation of an example catcher that may be used as a bottom hole catcher mechanism, in accordance with various embodiments.

FIG. 11 is a schematic representation of an embodiment of example features of catcher 620 that may be used as a bottom hole catcher mechanism as shown in FIGS. 6 and 7.

Other catcher devices may be realized. The catcher 620 can include pressure activated locking arms 621 for gripping a casing wall 609 and a latch mechanism 623 for retaining the fiber deployment mechanism 624. The catcher can be deployed with the casing, can be deployed with coil, or can be pumped down and then pressure activated.

FIG. 11 shows a pumped down version that has been activated by rupturing a low pressure burst disk 627 using pressure (shown as ruptured in FIG. 11). This allows pressure into a cylinder 628, which causes a piston 629 to move and expand the gripper arms 621 against the inner diameter of the casing wall 609, which may be a collar. A return spring 632 is compressed by the pressure force on the piston 629.

When the fiber deployment mechanism 624 reaches the catcher 620, spring latches 633 of the catcher 620 are forced open by a stabber 634 of the fiber deployment mechanism 624. The stabber can be attached to the float 617 of FIG. 6 as part of the fiber deployment mechanism 624. Then, the spring latches 633 retract to hold the fiber deployment mechanism 624 in place.

The fiber deployment mechanism 624 and the catcher 620 can be retrieved together by rupturing a high pressure rupture disk 636. The high pressure rupture disk 636 is high pressure in that it is ruptured at a pressure higher than the pressure that the pressure burst disk 627 is ruptured. This equalizes the pressure on both sides of the piston 629 and the spring 632 expands, causing the locking arms 621 to retract, freeing the assembly for retrieval. The fiber deployment mechanism 624 and the catcher 620 may be used for the deployable anchor of FIGS. 4, 5, and 10. As mentioned above with respect to a deployable anchor, for additional information regarding actuator mechanisms in downhole applications, see for example international patent publications such as WO2016137468A1, WO2016137465A1, and/or WO2016137462A1.

As shown in FIG. 6, the optical fiber 702 can be spliced or coupled to a surface optical cable 614 connected to surface instrumentation 616. The connection of the end of the optical fiber 702 and to the surface optical cable 614 may be conducted prior to moving the fiber spooler 610 down the production string 613 or at some time later in the procedure such as after capture of the fiber spooler by the catcher 620.

FIG. 7 is a schematic representation of the optical fiber 702 deployed by the pump down spooler fiber deployment of FIG. 6. The optical fiber 702 is coupled to the fiber spooler 610 that has been captured by the catcher 620 and runs in a spiral in the production string 613 in the well 603 to the well head exit 611 at the surface. The surface optical cable 614 couples the optical fiber 602 from the well head exit 611 to surface instrumentation 616 that may include an interrogator. The interrogator can include an optical source that generates an optical signal in the optical fiber 702 to the end of the optical fiber 702 at the captured fiber spooler 610, a receiver to receive an optical signal or signals in response to the interrogation signal from the optical source, and processing equipment to process the received optical signal(s). The received optical signal(s) can include data from the pressure gauge 622 and/or data from the optical fiber 702 itself being an optical fiber sensor and/or optical sensors deployed with respect to the optical fiber 702. The processing equipment of the interrogator of the surface instrumentation 616 can include one or more interferometric systems. The processing can be performed using one or more techniques as previously discussed or using other techniques of processing data from sensors associated with one or more optical fibers.

Methods in accordance with the teachings herein associated with FIGS. 4-7 are repeatable. If the optical fiber, laid or being laid in these methods, breaks or signal quality deteriorates, the optical fiber can be retrieved, or the optical fiber can be broken up by a suitable tool and pumped out. The coiled tubing method, the pump down method, or similar methods can be repeated to install new optical fiber.

Figure 8:
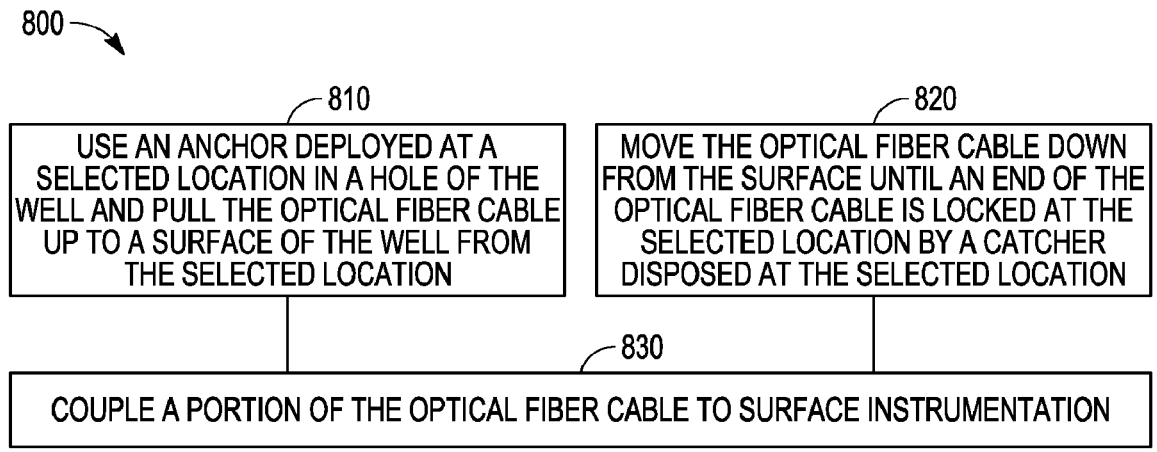
FIG. 8 is a flow diagram of features of an example method of installing an optical fiber cable into a well at a well site, in accordance with various embodiments.

FIG. 8 is a flow diagram of features of an embodiment of an example method 800 of installing an optical fiber cable into a well at a well site. In optical fiber deployment, a selection of a procedure to be used can be conducted to deploy the optical fiber cable to a selected location in the well. At 810, a procedure can use an anchor deployed at the selected location in a hole of the well and pull the optical fiber cable up to a surface of the well from the selected location. Such a procedure can include feeding the optical fiber cable into the hole of the well from the surface at the well site; deploying the anchor, to which one end of the optical fiber cable is attached, to hold the end of the optical fiber at the selected location in the hole; and after deploying the anchor, conveying an end to the optical fiber cable out of the hole, the conveyed end of the optical fiber cable being opposite to the end attached to the anchor. Such a procedure can include feeding a fiber spooler into the hole using a coiled tubing to which the fiber spooler is mounted, the fiber spooler including a spool containing the optical fiber cable and the anchor to which the one end of the optical fiber cable is attached; conveying the end to the optical fiber cable out of the hole by pulling the coiled tubing out of the hole while at the same time rotating the spool such that the optical fiber cable unspools; and coupling the portion of the optical fiber cable to the surface instrumentation after the fiber spooler reaches the surface from the pulling of the coiled tubing.

Using an anchor deployed at the selected location in a hole of the well and pull the optical fiber cable up to a surface of the well from the selected location can include using a mud motor to drive the fiber spooler and to rotate the spool. In a from-bottom-to-top procedure, pulling the coiled tubing out of the hole can include pulling the coiled tubing out of the hole at a steady velocity, while at the same time fluid is pumped down the coiled tubing causing the spool to rotate such that combination of linear and rotational motion causes the optical fiber cable to unspool in a spiral fashion against an interior wall of a piping in which the optical fiber cable is being inserted.

Variations of method 800 or methods similar to method 800 in a from-bottom-to-top procedure can include adjusting spiral pitch of the optical fiber cable by varying speed of revolution of the spool and/or adjusting linear speed of the pulling of the coiled tubing. Such methods can include deploying the anchor to include using a burst disk that provides downhole pressure to a piston that drives open levers gripping walls in the well. Gripping walls in the well can include gripping walls of piping in the well, where the optical fiber cable is being inserted in the piping in the well.

Variations of method 800 or methods similar to method 800 in a from-bottom-to-top procedure can include providing pressure readings at the selected location using a fiber optic pressure gauge contained in the anchor and communicating the pressure readings to the surface via a core of a set of cores in the optical fiber cable. Such methods in a from-bottom-to-top procedure can include retrieving the optical fiber cable in response to the optical fiber cable experiencing a break or experiencing deterioration of signal quality using the optical fiber cable, and installing a second optical fiber cable by anchoring an end of the second optical fiber cable at or proximate to the selected location and pulling up to the surface an end of the second optical fiber cable opposite the anchored end.

At 820, another procedure can move the optical fiber cable down from the surface until an end of the optical fiber cable is locked at the selected location by a catcher disposed at the selected location. Such a procedure can include anchoring an end of the optical fiber cable at the surface at the well site, the anchored end being opposite the locked end; rotating the optical fiber cable while moving the optical fiber cable down the hole of the well at the well site; and locking the optical fiber cable at the selected location in the hole. Such a procedure can include launching a fiber spooler into the hole using a spooler launcher, the fiber spooler including a spool containing the optical fiber cable and a neutral buoyancy float; moving the optical fiber cable down and rotating the optical fiber cable such that the optical fiber cable unspools until the catcher locks on to an end of the fiber spooler, the catcher being disposed at the selected location in the hole prior to latching with the fiber spooler; and coupling the portion of the optical fiber cable to surface instrumentation.

Moving the optical fiber cable down from the surface until an end of the optical fiber cable is locked at the selected location by a catcher disposed at the selected location can include using a mud motor to pump the fiber spooler and to rotate the spool. Using the mud motor can include passing a percentage of fluid flow through the mud motor using a conduit through the spool and the neutral buoyancy float while remainder of the fluid flow moves the fiber spooler downhole.

Variations of method 800 or methods similar to method 800 in a from-top-to-bottom procedure can include rotating the optical fiber cable while moving the optical fiber cable down a hole to cause the spool to rotate such that combination of linear and rotational motion causes the optical fiber cable to unspool in a spiral fashion against an interior wall of a piping in which the optical fiber cable is being inserted. Such a method can include fixing a relationship between rotational velocity and linear deployment velocity by an amount of fluid flow through a mud motor which is fixed in relationship to the total flow, creating a uniform spiral.

Variations of method 800 or methods similar to method 800 in a from-top-to-bottom procedure can include providing pressure readings of pressure at the selected location using a fiber optic pressure gauge contained in the fiber spooler and communicating the pressure readings to the surface via a core of a set of cores in the optical fiber cable. Such methods in a from-top-to-bottom procedure can include retrieving the optical fiber cable in response to the optical fiber cable experiencing a break or experiencing signal quality deterioration using the optical fiber cable, and installing a second optical fiber cable by anchoring an end of the second optical fiber cable at the surface, conveying the second optical fiber cable to the selected location, and locking an end of the second optical fiber cable at the selected location, the locked end of the second optical fiber cable opposite the anchored end.

At 830, for a from-top-to-bottom deployment or a from-bottom-to-top deployment, a portion of the optical fiber cable can be coupled to surface instrumentation. Coupling the portion of the optical fiber cable to surface instrumentation can include splicing the portion of the optical fiber cable to a surface cable connected to the instrumentation.

Figure 9:
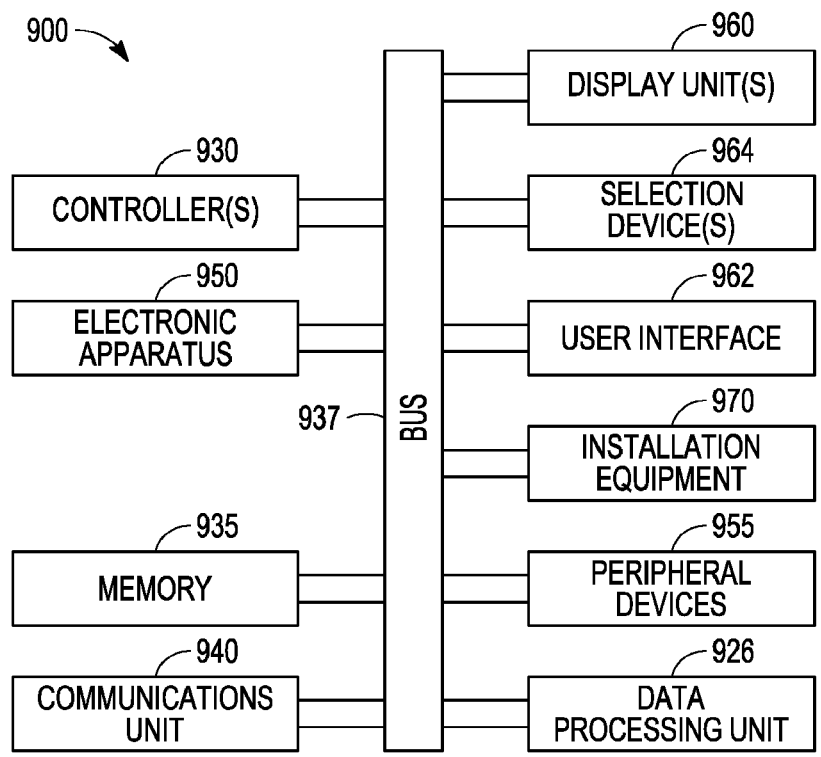
FIG. 9 is a block diagram of features of an example system operable to control installation of an optical fiber downhole in a well at a well site, in accordance with various embodiments.

FIG. 9 is a block diagram of features of an embodiment of an example system 900 operable to control installation of an optical fiber downhole in a well at a well site. The system 900 can be operable to conduct optical fiber installation in a from-bottom-to-top procedure and in a from-top-to-bottom procedure. The system 900 can include installation equipment 970. The installation equipment 970 can include installation components similar to or identical to installation components as taught herein. See for example, the installation equipment 970 can include the installation components associated with FIGS. 4-7. The system 900 can be arranged as a distributed system.

The system 900 can comprise controller(s) 930 to control the installation process and may control individual components of the installation equipment 970. The controller(s) 930 can be realized as one or more processors. The controller(s) 930 can be arranged as a single processor or a group of processors. Processors of the group of processors may operate independently depending on an assigned function. The controller(s) 930 can be realized as one or more application-specific integrated circuits (ASICs). The controller(s) 930 can be realized as control circuitry to manage the components of system 900.

The controller(s) 930 can be operable to control use of an anchor deployed at a selected location in a hole of the well and to control pulling of an optical fiber cable up to a surface of the well from the selected location. The controller(s) 930 can be operable to control moving an optical fiber cable down from the surface until an end of the optical fiber cable is locked at the selected location by a catcher disposed at the selected location. The system 900 can include a user interface 962 operable with the controller(s) 930, a data processing unit 926 operable with the user interface 962, where the controller(s) 930, the user interface 962, and the data processing unit 926 can be structured to be operated according to any scheme similar to or identical to the schemes associated with operating the installation equipment in an installation process as taught herein.

The system 900 can include a memory 935, electronic apparatus 950, and a communications unit 940. The controller(s) 930, the memory 935, and the communications unit 940 can be arranged to operate as a processing unit to control the installation of an optical fiber. The memory 935 can be realized as a memory module, which may include a set of memory devices and access devices to interface with the set of memory devices. The memory 935 can include a database having information and other data such that the system 900 can operate on data to control the individual components of the installation equipment 970. In an embodiment, the data processing unit 926 can be distributed among the components of the system 900 including memory 935 and/or the electronic apparatus 950. The electronic apparatus 950 can include drivers to provide voltage and/or current input to the individual components of the installation equipment 970 or to provide voltage and/or current input to the installation equipment 970, where a processor of the installation equipment 970 can control distribution of voltage and current to the individual components of the installation equipment 970.

The communications unit 940 may use combinations of wired communication technologies and wireless technologies at appropriate frequencies. The communications unit 940 can allow for a portion or all of commands regarding the status of components of the installation equipment 970 and/or the installation process to be provided to the user interface 962 for presentation on the one or more display unit(s) 960 aboveground. The communications unit 940 can allow for transmission of commands to the installation equipment 970 in response to signals provided by a user through the user interface 962.

The system 900 can also include a bus 937, where the bus 937 provides electrical conductivity among the components of the system 900. The bus 937 can include an address bus, a data bus, and a control bus, each independently configured. The bus 937 can be realized using a number of different communication mediums that allows for the distribution of components of the system 900. Use of the bus 937 can be regulated by the controller(s) 930. The bus 937 can include a communications network to transmit and receive signals including data signals and command and control signals. In a distributed architecture, the bus 937 may be part of a communications network.

In various embodiments, peripheral devices 955 can include additional storage memory and/or other control devices that may operate in conjunction with the controllers(s) 930 and/or the memory 935. The display unit(s) 960 can be arranged with a screen display as a distributed component that can be used with instructions stored in the memory 935 to implement the user interface 962 to manage the operation of the installation equipment 970 and/or components distributed within the system 900. Such a user interface can be operated in conjunction with the communications unit 940 and the bus 937. The display unit(s) 960 can include a video screen, a printing device, or other structure to visually project data/information and images. The system 900 can include a number of selection devices 964 operable with the user interface 962 to provide user inputs to operate the data processing unit 926 or its equivalent. The selection device(s) 964 can include one or more of a touch screen, a computer mouse, or other control device operable with the user interface 962 to provide user inputs to operate the data processing unit 926 or other components of the system 900.

The techniques and downhole fiber installation equipment, as taught herein, may be realized as semi-automatic installation methods in a from-top-to-bottom method using pump down fiber spooler or in a from-bottom-to-top method using a coiled tubing fiber spooler. The techniques and downhole fiber installation equipment, as taught herein, can eliminate the need for optical fiber in metal tubing, joint clamps, and blast protectors in optical deployment by installing optical fiber inside production string. Use of low cost optical fiber is tailored to these techniques, for example, optical fiber cables having large optical fiber diameter, multiple cores, neutral buoyancy jacket, and protective outer coating as discussed with respect to FIG. 1. The techniques taught herein can reduce installation time and labor significantly, which reduces rig time charges. These techniques provide installation methods that reduce the risk of breaking an optical fiber during installation. In addition, these techniques provide installation methods that are repeatable, allowing an optical fiber to be disposable. As a result of these techniques, better contact can be made with a pipe wall for better signal quality.

The following are example embodiments of methods, systems, and machine readable storage devices, in accordance with the teachings herein.

A method 1, of installing an optical fiber cable into a well at a well site, can comprise using an anchor deployed at a selected location in a hole of the well and pulling the optical fiber cable up to a surface of the well from the selected location or moving the optical fiber cable down from the surface until an end of the optical fiber cable is locked at the selected location by a catcher disposed at the selected location; and coupling a portion of the optical fiber cable to surface instrumentation.

A method 2 can include elements of method 1 and can include feeding the optical fiber cable into the hole of the well from the surface at the well site; deploying the anchor, to which one end of the optical fiber cable is attached, to hold the end of the optical fiber at the selected location in the hole; and after deploying the anchor, conveying an end to the optical fiber cable out of the hole, the conveyed end of the optical fiber cable being opposite to the end attached to the anchor.

A method 3 can include elements of method 2 and elements of method 1 and can include feeding a fiber spooler into the hole using a coiled tubing to which the fiber spooler is mounted, the fiber spooler including a spool containing the optical fiber cable and the anchor to which the one end of the optical fiber cable is attached; conveying the end to the optical fiber cable out of the hole by pulling the coiled tubing out of the hole while at the same time rotating the spool such that the optical fiber cable unspools; and coupling the portion of the optical fiber cable to the surface instrumentation after the fiber spooler reaches the surface from the pulling of the coiled tubing.

A method 4 can include elements of method 3 and elements of any of methods 1 and 2 and can include using a mud motor to drive the fiber spooler and to rotate the spool.

A method 5 can include elements of method 3 and elements of any of methods 1, 2, and 4 and can include pulling the coiled tubing out of the hole to include pulling the coiled tubing out of the hole at a steady velocity, while at the same time fluid is pumped down the coiled tubing causing the spool to rotate such that combination of linear and rotational motion causes the optical fiber cable to unspool in a spiral fashion against an interior wall of a piping in which the optical fiber cable is being inserted.

A method 6 can include elements of method 3 and elements of any of methods 1, 2, 4, and 5 and can include adjusting spiral pitch of the optical fiber cable by varying speed of revolution of the spool and/or adjusting linear speed of the pulling of the coiled tubing.

A method 7 can include elements of method 3 and elements of any of methods 1, 2, and 4-6 and can include coupling the portion of the optical fiber cable to surface instrumentation to include splicing the portion of the optical fiber cable to a surface cable connected to the instrumentation.

A method 8 can include elements of method 2 and elements of any of methods 1 and 3-7 and can include deploying the anchor to include using a burst disk that provides downhole pressure to a piston that drives open levers gripping walls in the well.

A method 9 can include elements of method 8 and elements of any of methods 1-8 and can include gripping walls in the well to include gripping walls of piping in the well, the optical fiber cable being inserted in the piping in the well.

A method 10 can include elements of method 2 and elements of any of methods 1 and 3-9 and can include providing pressure readings at the selected location using a fiber optic pressure gauge contained in the anchor and communicating the pressure readings to the surface via a core of a set of cores in the optical fiber cable.

A method 11 can include elements of method 2 and elements of any of methods 1 and 3-10 and can include retrieving the optical fiber cable in response to the optical fiber cable experiencing a break or experiencing deterioration of signal quality using the optical fiber cable, and installing a second optical fiber cable by anchoring an end of the second optical fiber cable at or proximate to the selected location and pulling up to the surface an end of the second optical fiber cable opposite the anchored end.

A method 12 can include elements of method 1 and elements of any of methods 2-11 and can include anchoring an end of the optical fiber cable at the surface at the well site, the anchored end being opposite the locked end; rotating the optical fiber cable while moving the optical fiber cable down the hole of the well at the well site; and locking the optical fiber cable at the selected location in the hole.

A method 13 can include elements of method 12 and elements of any of methods 1-11 and can include launching a fiber spooler into the hole using a spooler launcher, the fiber spooler including a spool containing the optical fiber cable and a neutral buoyancy float; moving the optical fiber cable down and rotating the optical fiber cable such that the optical fiber cable unspools until the catcher locks on to an end of the fiber spooler, the catcher being disposed at the selected location in the hole prior to latching with the fiber spooler; and coupling the portion of the optical fiber cable to surface instrumentation.

A method 14 can include elements of method 13 and elements of any of methods 1-12 and can include using a mud motor to pump the fiber spooler and to rotate the spool.

A method 15 can include elements of method 13 and elements of any of methods 1-12 and 13 and can include using the mud motor to include passing a percentage of fluid flow through the mud motor using a conduit through the spool and the neutral buoyancy float while remainder of the fluid flow moves the fiber spooler downhole.

A method 16 can include elements of method 13 and elements of any of methods 1-12, 14, and 15 and can include rotating the optical fiber cable while moving the optical fiber cable down a hole to cause the spool to rotate such that combination of linear and rotational motion causes the optical fiber cable to unspool in a spiral fashion against an interior wall of a piping in which the optical fiber cable is being inserted.

A method 17 can include elements of method 16 and elements of any of methods 1-15, 14, and 15 and can include fixing a relationship between rotational velocity and linear deployment velocity by an amount of fluid flow through a mud motor which is fixed in relationship to the total flow, creating a uniform spiral.

A method 18 can include elements of method 12 and elements of any of methods 1-11, and 13-17 and can include providing pressure readings of pressure at the selected location using a fiber optic pressure gauge contained in the fiber spooler and communicating the pressure readings to the surface via a core of a set of cores in the optical fiber cable.

A method 19 can include elements of method 12 and elements of any of methods 1-11, and 13-18 and can include retrieving the optical fiber cable in response to the optical fiber cable experiencing a break or experiencing signal quality deterioration using the optical fiber cable, and installing a second optical fiber cable by anchoring an end of the second optical fiber cable at the surface, conveying the second optical fiber cable to the selected location, and locking an end of the second optical fiber cable at the selected location, the locked end of the second optical fiber cable opposite the anchored end.

A system 1 can comprise: an optical fiber cable; an anchor deployable to fix an end of the optical fiber cable to a selected location downhole in a well at a wellsite or a catcher to catch and fix the end of the optical fiber cable at or proximate the selected location; and surface instrumentation to couple to a portion of the optical fiber cable.

A system 2 can include elements of system 1 and can include a coiled tubing; a fiber spooler mounted to the coiled tubing, the fiber spooler including a spool containing the optical fiber cable and the anchor to which the one end of the optical fiber cable is attached; and a mud motor arranged with the fiber spooler to drive the fiber spooler downhole in the well and to rotate the fiber spool.

A system 3 can include elements of system 2 and elements of system 1 and can include the anchor to include a burst disk operable to provide downhole pressure to a piston to drive open levers to grip walls.

A system 4 can include elements of system 1 and elements of any of systems 2 and 3 and can include a fiber spooler including a spool containing the optical fiber cable and a neutral buoyancy float; a spooler launcher operable to launch the fiber spooler down into the well; a mud motor to pump the fiber spooler to move the fiber spooler downhole in the well and to rotate the spool.

A system 5 can include elements of system 4 and elements of any of systems 1-3 and can include the spool and the neutral buoyancy float to include a conduit through which a percentage of fluid flow through the mud motor operatively passes while remainder of the fluid flow moves the fiber spooler downhole.

A system 6 can include elements of system 4 and elements of any of systems 1-3 and 5 and can include the neutral buoyancy float to include syntactic foam having a density to provide neutral buoyancy to the fiber spooler.

A system 7 can include elements of system 1 and elements of any of systems 1-6 and can include a fiber optic pressure gauge contained in the fiber spooler or a fiber optic pressure gauge contained in the anchor.

A system 8 can include elements of system 1 and elements of any of systems 1-7 and can include the optical fiber cable to include a set of cores within the optical fiber cable.

A system 9 can include elements of any of systems 1-8 and can include the optical fiber cable to include an optical fiber having a glass diameter greater than 125 μm.

A system 10 can include elements of system 9 and elements of any of systems 1-8 and can include the optical fiber having a glass diameter of 200 μm or greater.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:
1. A method of installing an optical fiber cable into a well at a well site, the method comprising:
feeding the optical fiber cable into a hole of the well from a surface at the well site to a selected location in the well on a spool attached to a deployable anchor;
deploying an anchor, to which one end of the optical fiber cable is attached, to hold the end of the optical fiber at the selected location in the hole;
after deploying the anchor, pulling the spool up to a surface of the well from the selected location to unspool the optical fiber cable from the spool in a spiral fashion;
conveying an end to the optical fiber cable out of the hole, the conveyed end of the optical fiber cable being opposite to the end attached to the anchor; and
coupling the conveyed end of the optical fiber cable to surface instrumentation.

2. The method of claim 1, wherein:
feeding the optical fiber cable into the well further includes feeding a fiber spooler into the well using a coiled tubing to which the fiber spooler is mounted, the fiber spooler including the spool containing the optical fiber cable and the anchor to which the one end of the optical fiber cable is attached; and
unspooling the optical fiber cable from the spool in a spiral fashion comprises rotating the spool such that the optical fiber cable unspools in a spiral.

3. The method of claim 2, wherein the method includes using a mud motor to drive the fiber spooler and to rotate the spool.

4. The method of claim of claim 2, wherein pulling the coiled tubing out of the hole includes pulling the coiled tubing out of the hole at a steady velocity, while at the same time fluid is pumped down the coiled tubing causing the spool to rotate such that combination of linear and rotational motion causes the optical fiber cable to unspool in the spiral fashion against an interior wall of a piping in which the optical fiber cable is being inserted.

5. The method of claim 2, wherein the method includes adjusting spiral pitch of the optical fiber cable by varying speed of revolution of the spool and/or adjusting linear speed of the pulling of the coiled tubing.

6. The method of claim of claim 1, wherein coupling the conveyed end of the optical fiber cable to the surface instrumentation includes splicing the portion of the optical fiber cable to a surface cable connected to the instrumentation.

7. The method of claim 1, wherein deploying the anchor includes using a burst disk that provides downhole pressure to a piston that drives open levers gripping walls in the well.

8. The method of claim of claim 7, wherein gripping walls in the well includes gripping walls of piping in the well, the optical fiber cable is being inserted in the piping in the well.

9. The method of claim 1, wherein the method includes providing pressure readings at the selected location using a fiber optic pressure gauge contained in the anchor and communicating the pressure readings to the surface via a core of a set of cores in the optical fiber cable.

10. The method of claim 1, wherein the method includes retrieving the optical fiber cable in response to the optical fiber cable experiencing a break or experiencing deterioration of signal quality using the optical fiber cable, and installing a second optical fiber cable by anchoring an end of the second optical fiber cable at or proximate to the selected location and pulling up to the surface an end of the second optical fiber cable opposite the anchored end.

11. The method of claim 1, wherein the method includes providing pressure readings of pressure at the selected location using a fiber optic pressure gauge and communicating the pressure readings to the surface via a core of a set of cores in the optical fiber cable.

12. A system comprising:
an optical fiber cable;
an anchor deployable to fix an end of the optical fiber cable to a selected location downhole in a well at a wellsite;
surface instrumentation to couple to a portion of the optical fiber cable at a surface at the wellsite;
a coiled tubing;
a fiber spooler mounted to the coiled tubing, the fiber spooler including a spool containing the optical fiber cable and the anchor to which the one end of the optical fiber cable is attached; and
wherein the optical fiber cable unspools from the fiber spooler in a spiral fashion as the fiber spooler is retrieved to the surface with the anchor deployed at the selected location.

13. The system of claim 12, wherein the anchor includes a burst disk operable to provide downhole pressure to a piston to drive open levers to grip walls.

14. The system of claim 12, wherein the system includes a fiber optic pressure gauge contained in the fiber spooler or a fiber optic pressure gauge contained in the anchor.

15. The system of claim 12, wherein the optical fiber cable includes a set of cores within the optical fiber cable.

16. The system of claim 12, wherein the optical fiber cable includes an optical fiber having a glass diameter greater than 125 μm.

17. The system of claim 16, wherein the optical fiber has a glass diameter of 200 μm or greater.

* * * * *